United States Patent
Kunert et al.

(10) Patent No.: US 6,630,194 B2
(45) Date of Patent: *Oct. 7, 2003

(54) METHOD OF MAKING PEPPERONI FLAKES OR PEPPERONI

(75) Inventors: Gale F. Kunert, Austin, MN (US); Steven C. Wobschall, Austin, MN (US)

(73) Assignee: Hormel Foods, LLC, Austin, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/526,951

(22) Filed: Mar. 16, 2000

(65) Prior Publication Data

US 2003/0021882 A1 Jan. 30, 2003

(51) Int. Cl.7 ................................................ A23L 1/317
(52) U.S. Cl. ...................................... 426/646; 426/473
(58) Field of Search ................................ 426/641, 646, 426/473

(56) References Cited

U.S. PATENT DOCUMENTS

| 4,220,668 A | | 9/1980 | Wistreich et al. ........... 426/266 |
|---|---|---|---|
| 4,263,329 A | | 4/1981 | Olson et al. ................. 426/310 |
| 4,279,935 A | | 7/1981 | Kentor ........................ 426/264 |
| 4,450,183 A | * | 5/1984 | Steinberg et al. ........... 426/646 |
| 4,781,937 A | * | 11/1988 | Knowles et al. ........ 426/646 X |
| 5,639,495 A | | 6/1997 | Alden et al. ................... 426/59 |
| 5,639,504 A | | 6/1997 | Fernandez et al. .......... 426/646 |
| 5,688,549 A | | 11/1997 | Roehrig et al. ............. 426/646 |
| 5,698,255 A | | 12/1997 | Roehrig et al. ............. 426/646 |
| 5,736,186 A | | 4/1998 | Holdren et al. ............. 426/646 |
| 5,942,265 A | | 8/1999 | Roberds et al. ............... 426/59 |
| 5,948,462 A | | 9/1999 | Atsuta et al. ................ 426/583 |

* cited by examiner

Primary Examiner—Arthur L. Corbin
(74) Attorney, Agent, or Firm—IPLM Group, P.A.

(57) ABSTRACT

The subject invention relates to a method of making pepperoni flakes or pepperoni. The applications for this invention are broad and would encompass any flavoring for a meat topping or ingredient product. Generally, the subject invention includes the use of fat raw materials rather than a lean/fat blend, the use of an emulsifier to reduce fat particle size and connective tissue, and a low moisture protein ratio of the end product. In addition, this method results in a rapid speed of the process. The product mixture is ground, cooked, and conveyed to a drum drier. The speed of the drum drier is determined by the desired moisture protein ratio, which is 1.6:1 or less for pepperoni.

23 Claims, No Drawings

METHOD OF MAKING PEPPERONI FLAKES OR PEPPERONI

BACKGROUND OF THE INVENTION

1. Field of the Invention

The subject invention relates to a method of making pepperoni flakes or pepperoni.

2. Description of the Prior Art

In preparing pepperoni products, it is desirous to obtain a final product in a relatively short period of time that is still rich in flavor. In order to retain the flavor, it is necessary to retain some of the fat of the product, but this often leaves the final product feeling greasy. Many processes known in the art include the use of acidulants or fermentation. These processes typically take about 10 to 14 days and result in about 40% to 45% fat in the final product.

Several of prior art patents use acid solutions. In the patent to Wistreich et al., U.S. Pat. No. 4,220,668, the sausage mixture is immersed in a lactic acid and other edible organic acid solution for several hours, wherein the pH throughout the cross section of the sausage mixture is below 5.2 after treatment. U.S. Pat. No. 4,263,329 to Olson et al. also discusses the use of a lactic acid solution, wherein the titratable acidity is 4% to 10% by weight. U.S. Pat. No. 4,279,935 to Kentor discusses a rapid method of producing dry sausages but indicates that this "rapid" time is 5 to 20 days. This method uses bactericides, bacteriostats and at least one chemical acidulating material. In the patent to Alden et al., U.S. Pat. No. 5,639,495, a particulate protein component and a lactic acid bacteria starter culture are used in a fermentation process. In the patent to Holdren et al., U.S. Pat. No. 5,736,186, a process for making dry sausage products is discussed wherein the product is dehydrated and the weight of moisture to the weight of protein ratio is no greater than 3.7:1. This process uses encapsulated acidulants with a melting point of at least 90° F., which lowers the pH of the product to less than 5.3.

In the patent to Fernandez et al., U.S. Pat. No. 5,639,504, a low fat, low salt and low phosphate sausage is discussed. A vacuum packed encased product is subjected to hydrostatic pressure of 500 to 2000 bars to obtain a pressure treated product, which is unpacked prior to cooking the encased product.

U.S. Pat. Nos. 5,688,549 and 5,698,255 to Roehrig et al. are directed to the use of meat with a high fat content in the production of hot dogs, sausages and hamburger patties. In U.S. Pat. No. 5,688,549, the fat content is reduced from approximately 60% to 10% by weight by passing the heated comminuted meat into a centrifuge to subject the meat to gravitational forces sufficient to reduce its fat content. The liquid phase (fat) and the lean meat phase are then separated. In U.S. Pat. No. 5,698,255, a high fat content meat is comminuted, heated and centrifuged to provide unformulated raw reduced fat meat having a fat content no greater than 10% by weight.

U.S. Pat. No. 5,942,265 to Roberds et al. discusses a process of extruding blended sausage into sheet form for fermentation and cooking.

Finally, U.S. Pat. No. 5,948,462 to Atsuta et al. discusses an emulsified composition of heat-denatured whey protein, edible oil and edible fat. This results in low fat sausage having a juicy feeling as usual sausage comprising animal fat such as hog fat and the like.

SUMMARY OF THE INVENTION

The subject invention relates to a method of making pepperoni flakes or pepperoni. In a preferred embodiment method for making pepperoni, a product mixture is ground and heated, whereby a product is created. The product is then dried on a drum drier to obtain a moisture protein ratio of 1.6:1 or less.

In a preferred embodiment method for making pepperoni flakes, a product mixture is ground and mixed, and then the product mixture is placed in a vessel and heated to a temperature, whereby a product is created. The excess fat is drained from the product, and the product is dried on a drum drier where a moisture protein ratio of 1.6:1 or less is obtained. In a preferred embodiment, the product is then allowed to cool and is sized and packaged.

In another preferred embodiment method for making pepperoni flakes, a product mixture is ground and mixed, and then the product mixture is emulsified and stuffed into casing. Then, the product mixture is cooked in a smokehouse, whereby a product is created. The product is allowed to cool, the casing is stripped off the product, and the product is ground. Then, the product is dried on a drum drier where a moisture protein ratio of 1.6:1 or less is obtained. In a preferred embodiment, the product is then allowed to cool and is sized and packaged.

DETAILED DESCRIPTION OF THE PREFERRED EMBODIMENT

The subject invention relates to a method of making pepperoni flakes or pepperoni. The applications for this invention are broad and would encompass any flavoring for a meat topping or ingredient product. Generally, the subject invention includes the use of fat raw materials rather than a lean/fat blend, the use of emulsification to reduce the fat particle size, and a moisture protein ratio of 1.6:1 or less in the end product. In addition, this method results in a rapid speed of the process.

The rapid speed of the process is significant because the process does not require the use of fermentation, cultures, or dry rooms. Also, this process lacks an acidification step to lower the pH of the product mixture. This process takes approximately one day as opposed to 10 to 14 days in a dry room.

The use of fat raw materials is also significant because it helps give the product a softer bite and retain its flavor. Also, the cost of fat raw materials is less expensive than the cost of a lean/fat blend or a lean raw material. Typically, fat raw materials contain approximately 50% fat or more, while lean raw materials contain approximately 30% fat or less. Because the fat is emulsified in the process, the pepperoni does not feel greasy to the touch but still retains its flavor. Emulsification in this process occurs when the product mixture is chopped and/or run through an emulsion mill, which results in the fat particles being finely dispersed within the product mixture. Therefore, the fat droplets cannot be seen readily by the human eye and when the pepperoni is dried on a drum, the fat droplets are retained in the product. This portion of the process resembles the processes used for hot dogs and bologna.

Finally, the moisture protein ratio of the end product is targeted for 1.6:1 or less for pepperoni. The moisture protein ratio of pepperoni for this method is approximately 1:1.

The preferred embodiment method for making pepperoni flakes or pepperoni begins with using fat raw material such as belly trim, 42% lean pork, or pork jowls in the product mixture. Pork, beef or a mixture of pork and beef could be used in the product mixture. Also, fat pork and/or fat beef with a 50% lean trim could be used. Using fat raw material rather than a lean/fat blend results in a softer bite in the final product, and fat raw material is less expensive than a lean/fat blend. Typically, fat raw materials contain approximately 50% fat or more, while lean raw materials contain approximately 30% fat or less. The preferred embodiment method uses raw material having a fat content of approximately 45% to 60%, while other processes typically use a 30% to 33% lean/fat blend. Then, the product mixture is ground with a ¼ inch plate, which provides better mixing action for the product mixture. However, the product mixture could be ground either finer (using a ⅛ to ¼ inch plate) or coarser (using a ⅜ to 1 inch plate) as long as the product mixture is ground to a size that mixes uniformly with the spices added to the formula. The product mixture is mixed, spices are added, and then the product mixture is mixed further for approximately 15 minutes, or until the spices are evenly distributed within the product mixture. Spices that may be added include anise, garlic, red pepper, black pepper, white pepper, fennel, and paprika. In addition, sodium nitrite is added as part of the cure to develop and enhance the red color of the product mixture. The product mixture is then transferred to a chopper/emulsifier where the product mixture is emulsified to a pasty consistency. A double emulsifying plate having two 3.0 mm plates is used to reduce the product mixture to a size of approximately 1.5 to 3.0 mm. In the preferred embodiment, a Griffith MINCE MASTER® Model 225–100 is used and the size of the opening in the plates is approximately 1.5 to 3.0 mm. This step homogenizes the product mixture, reducing the size of connective tissue and fat particles within the product mixture. Emulsification in this process occurs when the product mixture is chopped and/or run through an emulsion mill, which results in the fat particles being finely dispersed within the product mixture. This is a common step in the production of sausage. Therefore, the fat droplets cannot be seen readily by the human eye and when the pepperoni is later dried on a drum, the fat droplets are retained in the product mixture. Because the fat is emulsified in the process, the pepperoni does not feel greasy to the touch but still retains its flavor. This portion of the process resembles the processes used for hot dogs and bologna.

Next, the product mixture is stuffed into a cook-in-bag casing and cooked for approximately 4 to 5 hours in a smokehouse having an internal temperature of approximately 130 to 180° F., thereby cooking the product mixture internally at approximately 152 to 158° F. Therefore, the product mixture is cooked well enough so that it is a stable product. When the product mixture is first placed in the smokehouse, the internal temperature of the product mixture is approximately 40° F. and the internal temperature of the smokehouse is approximately 130° F., and then the temperatures of the smokehouse and the product mixture are raised to the temperatures stated. The use of a plastic casing prevents loss of moisture and/or fat when the product mixture is cooked in the smokehouse. Using a fiber casing risks losing moisture, which is not desired at this point in the process. After the product mixture is cooked, it is referred to as a product. The product is then allowed to cool, the casing is stripped off, and the product is ground with a ½ inch plate, but the product could be ground either finer (using a ⅛ to ½ inch plate) or coarser (using a ⅝ to 1 inch plate).

The product is then placed in a heated vessel with agitation. Agitation helps prevent the product from sticking to the vessel and ensures that the product is cooked uniformly. The use of a vessel helps prevent the loss of fat, and any source of heat may be used such as steam, gas, or electricity to heat the vessel. The preferred embodiment utilizes a steam-jacketed kettle, Groen Kettle Model TA200SP. The temperature is raised to approximately 180 to 210° F. to make a slurry of the product, and then the excess fat is then drained from the product. This helps the product roll over the drum drier more easily. The product is conveyed to a drum drier where the temperature is approximately 260 to 300° F. and where the distance between the drums is approximately 0.1 to 0.25 mm. The preferred embodiment uses Blow-Knox Drum Drier Model VLC-4. When the product is dried on a drum, the drum drier cooks the product and removes moisture from the product, which is necessary to obtain a moisture protein ratio of 1.6:1 or less. The required moisture protein ratio for pepperoni is 1.6:1 or less, and this process typically results in a moisture protein ratio of approximately 1:1. The drum speed is determined by the desired moisture protein ratio of 1.6:1 or less or the water activity level of approximately 0.75 to 0.85, and a revolution of the drums is approximately 45 to 90 seconds. The speed of the drum is adjusted periodically to obtain the desired water activity level of the product, which may be either too wet or too dry. The water activity level of approximately 0.75 to 0.85 ensures that the final product is a shelf stable product.

The dried product is then collected and allowed to cool. Then, the product is sized or cut to a proper size and packaged. The final product is approximately 28 to 32% fat rather than 40 to 45% fat, which is the typical percentage of pepperoni fat content. Therefore, the product is not as greasy because the fat is emulsified and not exposed when the product is dried. This method results in a very flavorful product within about 1 to 1 ½ days without the use of cultures, dry rooms, acidification or fermentation, which typically takes about 10 to 14 days.

Several of the steps discussed above in the preferred embodiment method are optional steps. A lean/fat blend could be used in the product mixture rather than a fat raw material, however, it is more expensive and the additional fat helps give the final product a softer bite and more flavor. Also, the use of ¼ inch and ½ inch plates during grinding of the product mixture and the product, respectively, are not the only size plates that can be used, and other suitable methods of grinding or size reduction of the product mixture may be utilized. The product mixture can be ground finer or coarser, but the product mixture should be ground to a size that blends well with the spices that are added. The product mixture could be mixed for approximately 5 to 15 minutes when the spices are added, as long as the spices are mixed uniformly throughout the product mixture. In addition, the use of the chopper/emulsifier is not necessary, but it homogenizes the product mixture and reduces the connective tissue and the fat particle size within the product mixture. Therefore, if the chopper/emulsifier is not used, the grinding of the product mixture must be at a smaller size of approximately ⅛ to ¼ inch.

Also, placing the product mixture in casing and cooking the product mixture in a smokehouse are optional steps, but these steps result in a better final product. To carry out the process without cooking the product mixture in the smokehouse, the product mixture is first mixed in a chopper/emulsifier. This blending of the product mixture extracts proteins from the product mixture and makes it sticky, and clumping may occur if uncoated salt is added during this step in the process. Therefore, either encapsulated salt should be used or the salt should be added later in the process, after the slurry is made, to prevent clumping of the product mixture. Then, the product mixture is placed in a kettle where a slurry is made at approximately 120 to 130° F., and the product is dried on the drum drier as previously described. The advantage to cooking the product mixture in a smokehouse is that it makes a more uniform product that performs better over the drum drier, and the cooking denatures the protein so the type of salt and when the salt is added is a moot issue.

Finally, creating a slurry of the product and draining the excess fat from the product are also optional, but these steps help the product roll over the drum drier much more easily, resulting in a better final product. In order for the subject method to work properly so as to result in the desired final product, either the product mixture must be cooked in a smokehouse or a slurry must be made, but both of these steps are optional as long as the other step is employed. Without creating the slurry and draining the fat after the product is ground with the ½ inch plate, the product is fed over the drum drier, but the product tends to be patchy over the drum drier, and the product tends to stick to the drum. Therefore, creating the slurry first helps the product flow better over the drum drier and results is a better final product.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for making pepperoni, comprising the steps of:
   a) creating a product mixture including a meat fat raw material, said fat raw material having a fat content of approximately 45% or higher;
   b) grinding and mixing said product mixture;
   c) emulsifying said product mixture thereby finely dispersing fat particles within said product mixture;
   d) cooking said product mixture whereby a stable product is created; and
   e) draining excess fat from said product; and then
   f) drying said product on a drum drier thereby obtaining a moisture protein ratio of 1.6:1 or less.

2. The method of claim 1, wherein said fat raw material has a fat content of approximately 45% to 60%.

3. The method of claim 1, wherein said fat raw material is a material selected from the group consisting of fat pork material, fat beef material, or a blend of fat pork material and fat beef material.

4. The method of claim 1, further comprising adding spices to said product mixture, wherein said product mixture is ground to a size that will mix uniformly with said spices and is mixed for approximately 15 minutes in step (b).

5. The method of claim 1, wherein said product mixture is cooked in a vessel in step (d).

6. The method of claim 5, further comprising adding encapsulated salt to said product mixture in step (b).

7. The method of claim 5, further comprising adding salt to said product mixture in step (d).

8. The method of claim 1, wherein said product is cooked over said drum drier at approximately 260 to 300° F. in step (e).

9. The method of claim 1, wherein said product is approximately 28% to 32% fat in step (f).

10. The method of claim 1, wherein said product has a water activity level of approximately 0.75 to 0.85 in step (e).

11. A method for making pepperoni, comprising the steps of:
    a) grinding and mixing a product mixture including a meat fat raw material, said fat raw material having a fat content of approximately 45% or higher;
    b) emulsifying said product mixture thereby finely dispersing fat particles within said product mixture;
    c) placing said product mixture in a vessel and heating said product mixture to a temperature whereby said product mixture is cooked to create a stable product;
    d) draining excess fat from said product; and then
    e) drying said product on a drum drier and obtaining a moisture protein ratio of 1.6:1 or less.

12. The method of claim 11, wherein said fat raw material has a fat content of approximately 45% to 60%.

13. The method of claim 11, wherein said fat raw material is a material selected from the group consisting of fat pork material, fat beef material, or a blend of fat pork material and fat beef material.

14. The method of claim 11, further comprising adding spices to said product mixture, wherein said product mixture is ground to a size that will mix uniformly with said spices and is mixed for approximately 15 minutes in step (a).

15. The method of claim 11, further comprising adding encapsulated salt to said product mixture in step (a).

16. The method of claim 11, wherein said product mixture is ground to approximately ⅛ to ¼ inch in step (a).

17. The method of claim 11, wherein said product mixture is cooked at approximately 180 to 210° F. in step (c).

18. The method of claim 11, wherein said product mixture is cooked at approximately 120 to 130° F. in step (c).

19. The method of claim 18, further comprising adding salt to said product mixture.

20. The method of claim 11, wherein said product is cooked over said drum drier at approximately 260 to 300° F. in step (e).

21. The method of claim 11, wherein said product is approximately 28% to 32% fat in step (e).

22. The method of claim 11, wherein said product has a water activity level of approximately 0.75 to 0.85 in step (e).

23. The method of claim 11, further comprising allowing said product to cool, sizing said product, and packaging said product.

* * * * *